United States Patent
Brown et al.

(10) Patent No.: US 11,537,368 B2
(45) Date of Patent: Dec. 27, 2022

(54) INTEGRATING MACHINE LEARNING MODELS INTO AN INTERPRETED SOFTWARE DEVELOPMENT ENVIRONMENT

(71) Applicant: Apple Inc., Cupertino, CA (US)

(72) Inventors: Alexander B. Brown, Mountain View, CA (US); Michael R. Siracusa, Mountain View, CA (US); Norman N. Wang, Saratoga, CA (US)

(73) Assignee: Apple Inc., Cupertino, CA (US)

( * ) Notice: Subject to any disclaimer, the term of this patent is extended or adjusted under 35 U.S.C. 154(b) by 601 days.

(21) Appl. No.: 15/721,722

(22) Filed: Sep. 29, 2017

(65) Prior Publication Data

US 2018/0349114 A1    Dec. 6, 2018

Related U.S. Application Data

(60) Provisional application No. 62/514,782, filed on Jun. 3, 2017.

(51) Int. Cl.
| | |
|---|---|
| *G06F 8/41* | (2018.01) |
| *G06N 20/00* | (2019.01) |
| *G06N 3/10* | (2006.01) |
| *G06N 3/04* | (2006.01) |
| *G06F 8/30* | (2018.01) |

(52) U.S. Cl.
CPC .............. *G06F 8/427* (2013.01); *G06F 8/447* (2013.01); *G06N 3/0454* (2013.01); *G06N 3/105* (2013.01); *G06N 20/00* (2019.01); *G06F 8/315* (2013.01)

(58) Field of Classification Search
CPC ....................................................... G06F 8/427
USPC ........................................................ 717/143
See application file for complete search history.

(56) References Cited

U.S. PATENT DOCUMENTS

| | | |
|---|---|---|
| 6,549,918 B1 | 4/2003 | Probert, Jr. et al. |
| 6,877,155 B1 | 4/2005 | Lindsey |
| 6,986,101 B2 | 1/2006 | Cooper et al. |
| 7,367,017 B2 * | 4/2008 | Maddocks .............. G06F 9/451 |
| | | 717/115 |

(Continued)

OTHER PUBLICATIONS

Anh Tuan Nguyen, Tung Thanh Nguyen, and Tien N. Nguyen. 2014. Migrating code with statistical machine translation. In Companion Proceedings of the 36th International Conference on Software Engineering (ICSE Companion 2014). Association for Computing Machinery, New York, NY, USA, 544-547 (Year: 2014).*

(Continued)

*Primary Examiner* — James D. Rutten
(74) *Attorney, Agent, or Firm* — BakerHostetler

(57) ABSTRACT

The subject technology provides for parsing a line of code in a project of an integrated development environment (IDE). The subject technology executes indirectly, using the interpreter, the parsed line of code. The interpreter references a translated source code document generated by a source code translation component from a machine learning (ML) document written in a particular data format. The translated source code document includes code in a chosen programming language specific to the IDE, and the code of the translated source code document is executable by the interpreter. Further the subject technology provides, by the interpreter, an output of the executed parsed line of code.

20 Claims, 10 Drawing Sheets

(56) References Cited

U.S. PATENT DOCUMENTS

| | | | | |
|---|---|---|---|---|
| 7,774,746 | B2* | 8/2010 | Mansfield | G06F 40/154 |
| | | | | 717/106 |
| 8,504,984 | B1* | 8/2013 | Yang | G06F 8/33 |
| | | | | 717/112 |
| 8,656,372 | B2 | 2/2014 | Vargas | |
| 8,793,240 | B2 | 7/2014 | Potapov et al. | |
| 9,026,997 | B2 | 5/2015 | Gangadharappa et al. | |
| 2002/0091998 | A1* | 7/2002 | Fraser | G06F 8/31 |
| | | | | 717/136 |
| 2003/0131337 | A1* | 7/2003 | Perumainar | G09B 19/0053 |
| | | | | 717/100 |
| 2004/0261065 | A1* | 12/2004 | Abrams | G06F 8/47 |
| | | | | 717/140 |
| 2006/0271920 | A1 | 11/2006 | Abouelsaadat | |
| 2007/0220478 | A1* | 9/2007 | Wyganowski | G06F 8/36 |
| | | | | 717/100 |
| 2010/0223213 | A1* | 9/2010 | Su | G06F 9/5066 |
| | | | | 706/12 |
| 2010/0269095 | A1* | 10/2010 | King | G06F 8/41 |
| | | | | 717/111 |
| 2012/0297369 | A1* | 11/2012 | Costa | G06F 11/3672 |
| | | | | 717/126 |
| 2016/0012350 | A1 | 1/2016 | Narayanan et al. | |
| 2016/0093232 | A1* | 3/2016 | Chong | G09B 19/06 |
| | | | | 434/118 |
| 2016/0357519 | A1 | 12/2016 | Vargas | |
| 2017/0277521 | A1* | 9/2017 | Sharma | G06F 8/40 |

OTHER PUBLICATIONS

Y. Oda et al., "Learning to Generate Pseudo-Code from Source Code Using Statistical Machine Translation," 2015 30th IEEE/ACM International Conference on Automated Software Engineering (ASE), Lincoln, NE, USA, 2015, pp. 574-584 (Year: 2015).*

A. Kumar, R. C. Panicker and A. Kassim, "Enhancing VHDL learning through a light-weight integrated environment for development and automated checking," Proceedings of 2013 IEEE International Conference on Teaching, Assessment and Learning for Engineering (TALE), 2013, pp. 570-575 (Year: 2013).*

* cited by examiner

INTEGRATING MACHINE LEARNING MODELS INTO AN INTERPRETED SOFTWARE DEVELOPMENT ENVIRONMENT

CROSS-REFERENCE TO RELATED APPLICATIONS

The present application claims the benefit of U.S. Provisional Patent Application Ser. No. 62/514,782, entitled "INTEGRATING MACHINE LEARNING MODELS INTO AN INTERPRETED SOFTWARE DEVELOPMENT ENVIRONMENT," filed Jun. 3, 2017, which is hereby incorporated herein by reference in its entirety and made part of the present U.S. Utility patent application for all purposes.

TECHNICAL FIELD

The present description relates generally to transformation and presentation of machine learning models in integrated development environments, including interpreted software development environments.

BACKGROUND

Software development environments can be used to create a software program in a given programming language on different computing platforms.

BRIEF DESCRIPTION OF THE DRAWINGS

Certain features of the subject technology are set forth in the appended claims. However, for purpose of explanation, several embodiments of the subject technology are set forth in the following figures.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a thorough understanding of the subject technology. However, the subject technology is not limited to the specific details set forth herein and can be practiced using one or more other implementations. In one or more implementations, structures and components are shown in block diagram form in order to avoid obscuring the concepts of the subject technology.

Existing approaches for enabling software developers to utilize machine learning models in software development environments may require a significant amount of configuration. In some instances, developing machine learning models requires setting up additional software libraries, hardware configurations, etc., which may create a perceived barrier to entry for some software developers. Further, many software developers are well-versed in working in the paradigms of object oriented programming that are integrated in many existing tools for developing software. In comparison, recent developments in the machine learning area have produced software libraries, provided by different third parties, that are designed to work in a stand-alone or separate development environments and can require software developers to adopt a different approach to developing machine learning models that depart, sometimes quite extensively, from the understood concepts of object oriented programming that many developers are accustomed.

In one or more implementations described herein, machine learning (ML) models can be internally represented within an integrated software development environment (IDE), such as an interpreted software development environment, in a manner analogous to internal representations of first class objects such as functions, classes, and the like, as opposed to merely being represented as opaque resources of the program being built. A software developer working with such a model can then take advantage of productivity features of the IDE such as syntax checking while typing, auto-completion, detection of name or type errors in parameter lists, etc., for invocations of the ML model functionality just as the developer might when using a standard system library or class. Mechanisms to achieve this include having a standard specification for description of ML models, creation of derived data from the model that is then used to index names and keywords within the model, and use of these indexed names and keywords by the IDE to provide the improved functionality described above.

Figure 1:
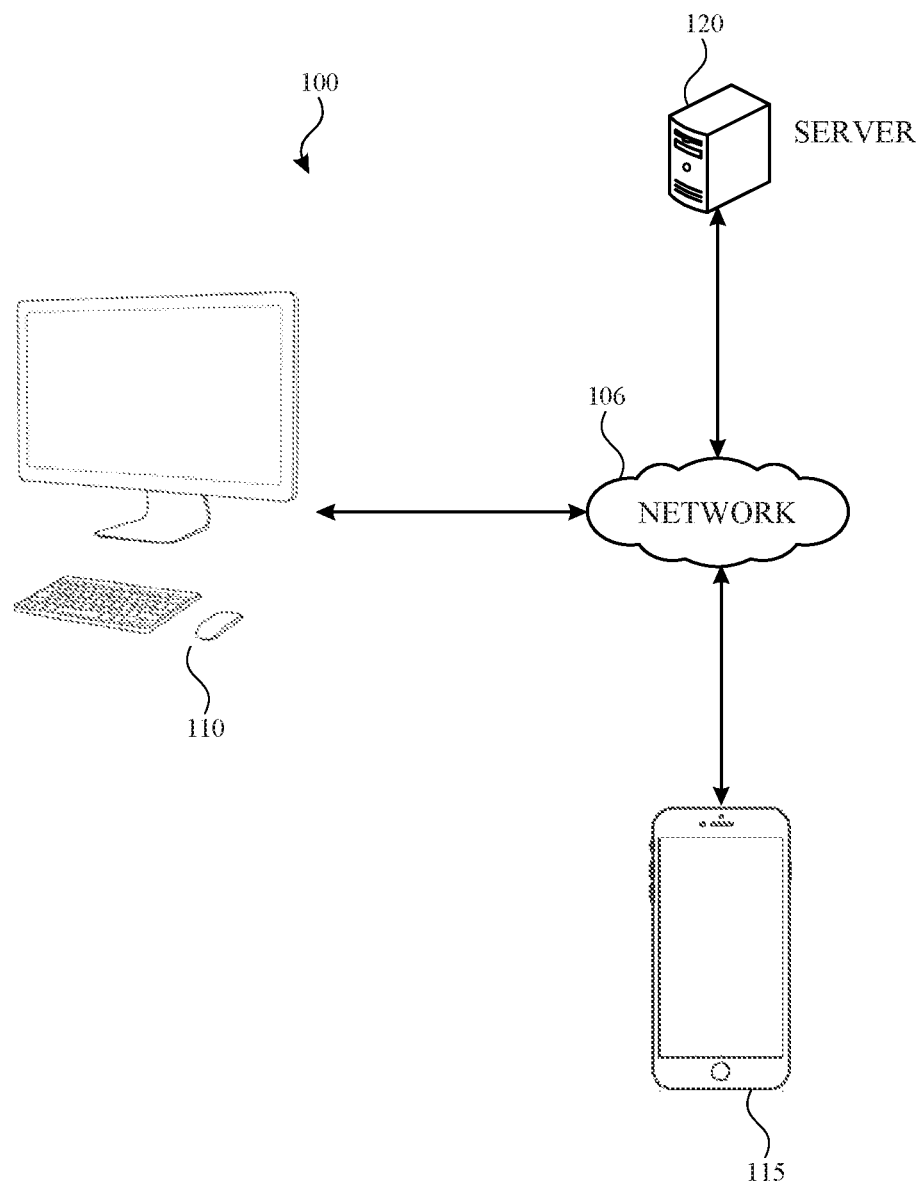
FIG. 1 illustrates an example network environment in which a system for integrating learning models into a software development system may be implemented in accordance with one or more implementations.

FIG. 1 illustrates an example network environment 100 in which a system for integrating learning models into a software development system may be implemented in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The network environment 100 includes an electronic device 110, an electronic device 115, and a server 120. The network 106 may communicatively (directly or indirectly) couple the electronic device 110 and/or the server 120. In one or more implementations, the network 106 may be an interconnected network of devices that may include, or may be communicatively coupled to, the Internet. For explanatory purposes, the network environment 100 is illustrated in FIG. 1 as including electronic devices 110 and 115, and a server 120; however, the network environment 100 may include any number of electronic devices and any number of servers, such as a cloud of servers.

The electronic device 110 may be, for example, desktop computer, a portable computing device such as a laptop computer, a smartphone, a peripheral device (e.g., a digital camera, headphones), a tablet device, a wearable device such as a watch, a band, and the like, or any other appropriate device that includes, for example, one or more wireless interfaces, such as WLAN radios, cellular radios, Bluetooth radios, Zigbee radios, near field communication (NFC) radios, and/or other wireless radios. In FIG. 1, by way of example, the electronic device 110 is depicted as a desktop computer. The electronic device 110 may be, and/or may include all or part of, the electronic system discussed below with respect to FIG. 10.

The electronic device 115 may include a touchscreen and may be, for example, a portable computing device such as a laptop computer that includes a touchscreen, a smartphone that includes a touchscreen, a peripheral device that includes a touchscreen (e.g., a digital camera, headphones), a tablet device that includes a touchscreen, a wearable device that includes a touchscreen such as a watch, a band, and the like, any other appropriate device that includes, for example, a touchscreen, or any electronic device with a touchpad. In one or more implementations, the electronic device 115 may not include a touchscreen but may support touchscreen-like gestures, such as in a virtual reality or augmented reality environment. In one or more implementations, the electronic device 115 may include a touchpad. In FIG. 1, by way of example, the electronic device 115 is depicted as a mobile device with a touchscreen. In one or more implementations, the electronic device 115 may be, and/or may include all or part of, the electronic device discussed below with respect to the electronic system discussed below with respect to FIG. 710.

In one or more implementations, the electronic device 110 may provide a software development environment such as a computer program that a software developer can use to create compiled (e.g., executable) code, debug, maintain, or otherwise support computer programs and applications. For example, the software development environment, using the compiled code, can create a software package for deployment on a target device with facilitation from the server 120.

In one or more implementations, the server 120 deploys the compiled code to a target device for execution. The electronic device 115, in an example, may be a target device for receiving the compiled code and executing the compiled code in a runtime environment of the electronic device 115. In another example, the server 120 (and/or another server) may provide a web service and can perform operations associated with the compiled code, such as complex processing operations.

Figure 2:
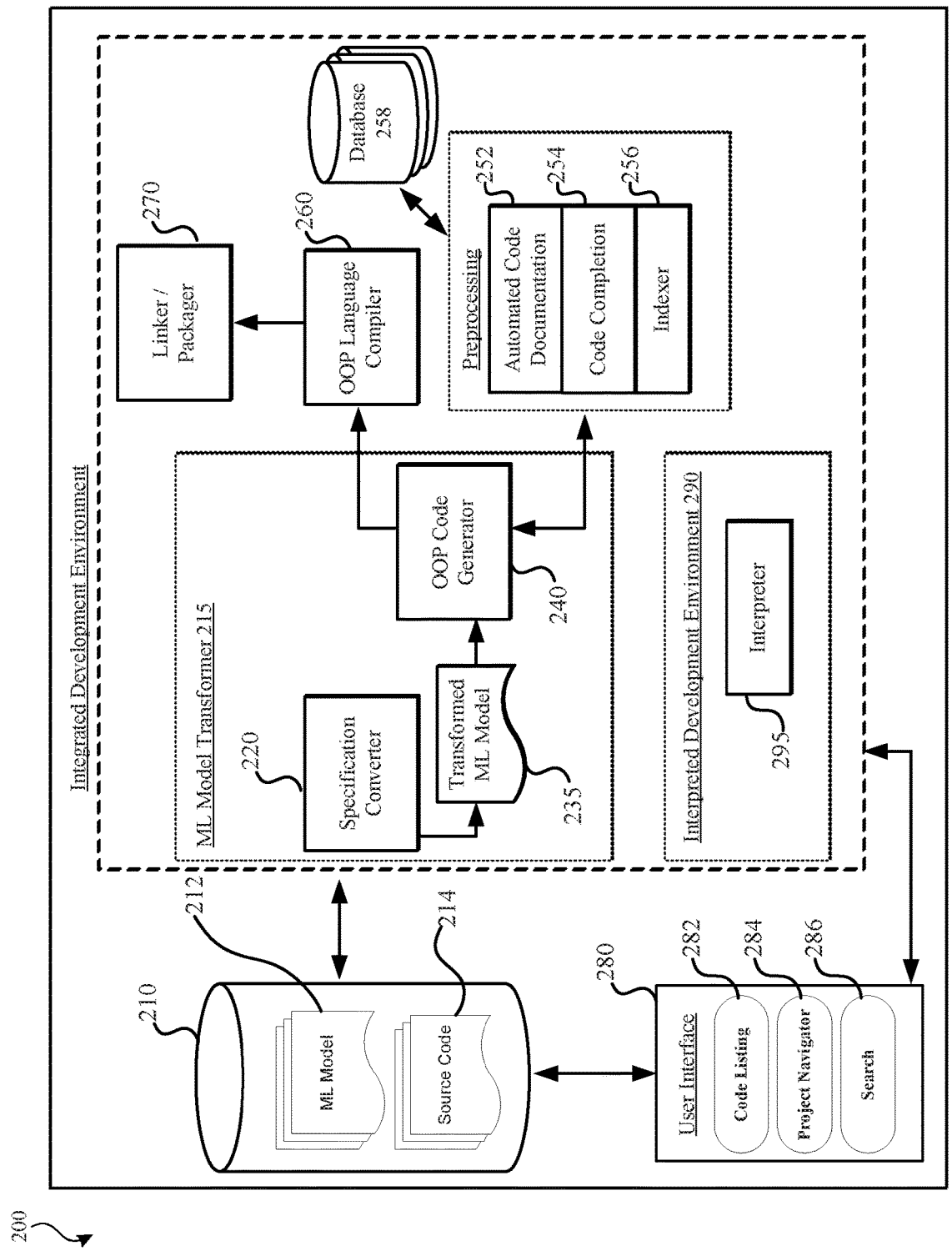
FIG. 2 illustrates an example software architecture for an integrated development environment that integrates machine learning (ML) models with object oriented code in accordance with one or more implementations.

FIG. 2 illustrates an example software architecture for an integrated development environment 200 that integrates machine learning models with object oriented code in accordance with one or more implementations. For explanatory purposes, the integrated development environment (IDE) 200 is described as being provided by the electronic device 110 of FIG. 1, such as by a processor and/or memory of the electronic device 110; however, the IDE 200 may be implemented by any other electronic device. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

The IDE 200 may be a multi-platform software development environment such as, for example, the Xcode® Integrated Development Environment or the like, which provides features that software developers can use to create, run, and debug computer program code. In one or more implementations, the IDE 200 executes in a process on the electronic device 110, such as a desktop computer running an operating system, e.g., Mac OS X™ or the like.

In one or more implementations, the IDE 200 provides a user interface 280 that can be presented on a display of the electronic device 110. The user interface 280 can display a code listing 282, such as the source code of a program being developed, in an editor. The source code may be computer program code instructions in an object oriented programming language such as Swift, Objective C, C++, Python, Java, etc. The user interface 280 also provides a project navigator 284 which may be displayed when a new software development project is created. The project navigator 284 enables a user to manage files in the project and/or select a file to view or edit in the editor that provides the code listing 282. The user interface 280 also provides a search interface 286 for searching terms in the code listing 282, files in the project, and/or other assets, etc.

The IDE 200 further includes a storage 210 which stores machine learning (ML) models 212 and associated ML data (e.g., a dataset for the ML model), source code files 214 and/or other data related to software development projects of the IDE 200 in memory. The machine learning models may include data represented in a format or syntax in accordance with machine learning software libraries such as TensorFlow, Keras, Caffe, etc., which may not be supported by the IDE 200. Example machine learning models may apply machine learning techniques such as automated processes to extract patterns from data, algorithms that automatically identify a relationship between descriptive features and a target feature in a dataset (e.g., a predictive model), deep neural networks, classifiers that specify which of categories some input belongs (e.g., a classifier), etc. Other types of machine learning models are contemplated herein and the preceding examples are non-limiting to the subject technology. Further, machine learning models may be associated with (e.g., suppled with in a repository or for download from a web-page) source code usage examples, tutorials or reference implementations written in a language such as JAVA or .NET or an API which may not supported by the IDE 200 or only supported for certain deployment scenarios.

For integrating existing machine learning models (e.g., ML models 212), the IDE 200 may include a machine learning (ML) model transformer 215 that includes a specification converter 220, and an object oriented programming (OOP) code generator 240. Each of these components is further described below. An example process of transforming an existing ML model is described further below in FIG. 2. Although the ML model transformer 215 is illustrated as part of the IDE 200, in some implementations, the ML model transformer 215 may execute as a separate process from the IDE 200. Further, although objected oriented programming is mentioned with respect to the OOP code generator 240 and other components herein, it is appreciated that other types of programming languages are contemplated by the subject technology and that object oriented programming languages are used herein for purposes of explanation. In particular, any programming language may be utilized with respect to the components of the IDE 200 and still be within the scope of the subject technology.

As illustrated, the IDE 200 also provides the specification converter 220. In an example, the specification converter 220 may receive a ML model 212 from the storage 210. The specification converter 220 determines and/or validates whether an existing ML model in a first format (e.g., Keras, TensorFlow, Caffe, etc.) includes sufficient data to conform to a particular model specification (e.g., a model specification provided by a third party vendor or other entity) that is supported by or compatible with the IDE 200. An example model specification may define parameters, data formats, data types and/or processing or hardware requirements for converting a given machine learning model into a code format suitable for leveraging features provided by the IDE 200, including, for example, syntax checking while typing, auto-completion, detection of name or type errors in parameter lists, etc. The specification converter 220 transforms the ML model 212 into a transformed ML model 235 that is in a format compatible with the particular model specification (e.g., the transformed ML model) supported by the IDE 200. In an implementation, the specification converter 220 can utilize a serialization format (e.g. "ProtoBuf" or protocol buffers) to store the transformed ML model 235 in a data schema of the particular model specification.

The OOP code generator 240 generates a code interface for the transformed ML model. A code interface may refer to code statements, in a particular programming language, that describe functions and/or data types required for using the transformed ML model. A function, that uses the transformed ML model, can accept one or more data types (e.g., as input variables to the function) in an example. The code interface of the transformed ML model, in an example, therefore provides functions and data types that are compatible with the particular programming language, as used in the current project. In an example, the OOP code generator 240 determines the data types in the particular programming language and its APIs that can access existing ML data associated with the transformed model. In an example, OOP code generator 240 creates a thunk (e.g., a subroutine) that facilitates accessing values of the existing ML data via the particular data type supported in the particular programming language. An example process with more details on generating the code interface and other code for the transformed ML model is described in FIG. 3, where the programming language and its APIs support multiple types, which correspond to existing ML data types, in which the specific type chosen may be selected on the basis of appropriateness or familiarity to skilled programmers.

The OOP code generator 240, in an implementation, can be perform the following operations. For each type Tm used by the model, select a type Tpn available in the programming language and its APIs. In a case where multiple types Tp may be available, select the 'best' type such that the most frequently used would be a good choice, one that is in the programming language should be preferred to one that is only in the APIs. For each function Fm used by the model, which takes as input a set of values of Types Tmi1, Tmi2 and returns as output a set of Values Tmv1, Tmv2, etc.— generate a function which takes as inputs the corresponding types Tpi1, Tpi2 Tpi2, Tpv1, Tpv2. Inside the function, generate code that transforms each model type to or from the language type, which could be simple, or it may require multiple steps. This generated code is called a thunk.

In one or more implementations, an additional non-code based payload (e.g., "compiled ML model") is also generated from the ML model and delivered into a package sent to target device. The package may include a compiled representation of the generated code interface and the generated code, and include this compiled ML model (e.g., the non-code based payload). This non-code based payload is different than a compiled representation of the generated code interface and code discussed above. In an example, the compiled ML model in this regard includes trained weights and other information which is useful on the target device and not supplied in an appropriate form with the generated code discussed above for the following reasons: 1) source code isn't great at holding lots of data (impedance, space, speed); and 2) despite being very accessible to users, source-code types are generally not as easily introspectable as data types for machines (e.g., software)—so other components wishing to reason about the model may prefer to visit the data (e.g., determining a size of an image that a user wants).

The OOP code generator 240 may also determine which, if any, other existing software libraries (e.g., stored on the storage 210) may be required for compiling and/or executing the transformed ML model such as a graphics processing unit (GPU) library that provides support for executing instructions on a GPU. An example structure of data associated with the transformed ML model is described in more detail in FIG. 6.

Additionally, the generated code interface can be viewed in the UI 280 using the project navigator 284 in an example. An example process for viewing the generated code interface is discussed in more detail in FIG. 4.

The OOP language compiler 260 compiles the generated code interface and generates object code for the code interface.

As further shown, as part of building an executable application, a linker/packager 270 combines one or more object files (e.g., from the OOP language compiler 260) and, in some instances, code from an existing software library (e.g., GPU library for machine learning), transforms the aforementioned object code and/or library code into executable machine code that can be executed by the electronic device 110. A packager portion of the linker/packager 270 reads the executable code into memory and runs the code resulting in a running application. In another example, the linker/packager 270 can send the executable code to a target electronic device for deployment. An example process for sending a fully compiled ML model to a runtime environment of a target device is discussed in more detail in FIG. 5.

The IDE 200 further includes preprocessing components that provide different features for the transformed ML model. As illustrated, an automated code documentation component 252 performs preprocessing to enable live documentation corresponding to code being input by a user and/or existing code in the project. In an example, the automated code documentation component 252 provides information regarding aspects of the ML model code and provides additional details about the model such as a description of a given function, a listing of the parameters for the function, information related to errors, if any, thrown by the function, any return value for the function, and any comments for the code. A code completion component 254 provides auto completion suggestions of code as the user is typing into the code listing 282 in the editor of the IDE 200. An indexer provides indexing of the ML model code for searching by the search interface 286. Any data (e.g., a search index, documentation, auto completion suggestions, etc.) for the aforementioned preprocessing components may be stored in a database 258.

Although the utilization of a compiler is described above in the discussion of the IDE 200 of FIG. 2, the IDE 200 in at least an implementation includes support for providing an interpreted development environment 290 in which an interpreter 295 is utilized to interpret and execute the source code files 214 without compiling such source code ahead of time.

Figure 3:
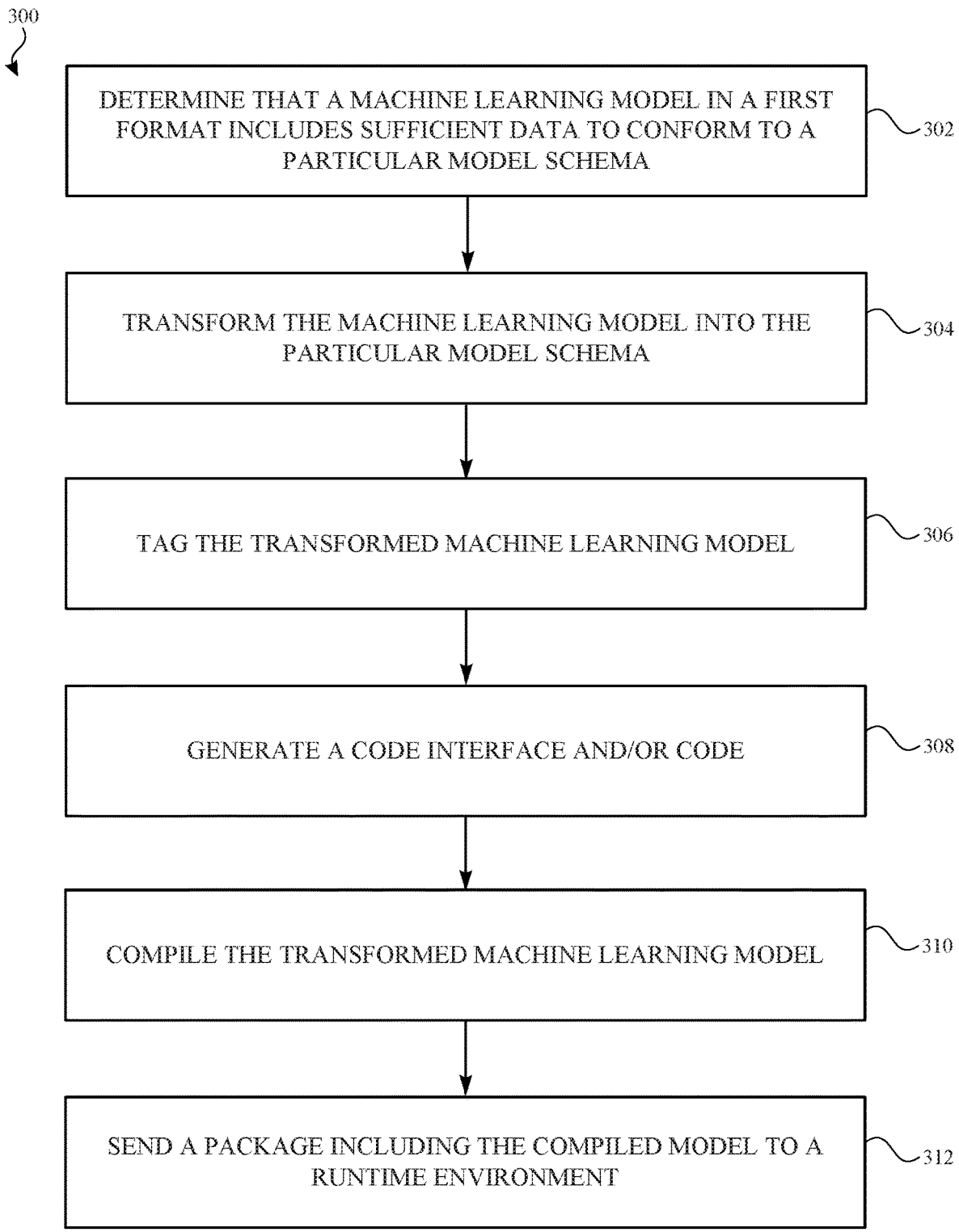
FIG. 3 illustrates a flow diagram of an example process for transforming an existing ML model to a model specification in accordance with one or more implementations.

FIG. 3 illustrates a flow diagram of an example process 300 for transforming an existing ML model to a model specification in accordance with one or more implementations. For explanatory purposes, the process 300 is primarily described herein with reference to various components of the IDE 200 of FIG. 2, which may be executed by one or more processors of the electronic device 110 of FIG. 1. However, the process 300 is not limited to the electronic device 110 and/or the IDE 200, and one or more blocks (or operations) of the process 300 may be performed by one or more other components of other suitable devices and/or software development environments. Further for explanatory purposes, the blocks of the process 300 are described herein as occurring in serial, or linearly. However, multiple blocks of the process 300 may occur in parallel. In addition, the blocks of the process 300 need not be performed in the order shown and/or one or more blocks of the process 300 need not be performed and/or can be replaced by other operations.

The ML model transformer 215 of the IDE 200 determines that a machine learning (ML) model in a first format (e.g., Keras, TensorFlow, etc.) includes sufficient data to conform to a particular model specification in a second format (302). The second format corresponds to an object oriented programming language (e.g., Swift, Objective C, etc.) in an example. In particular, the specification converter 220 can determine whether an existing model is missing data/objects required for conversion, and determine whether the existing model is not valid and/or consistent generally (e.g., incorrect data, operation(s) performed by the model not consistent with purported goal or result, etc.). In such instances where the ML model includes insufficient data or is not valid, the ML model transformer 215 may provide an error statement and forgo further processing of the ML model.

The specification converter 220 can also perform an additional transformation on the data inside the existing model to better suit the existing libraries on the user's development environment. (e.g., where the existing model is in a TensorFlow format, then transforming the model data into a format based an existing library in user's development environment).

After the ML model is determined to include sufficient data, the specification converter 220 transforms the ML model into the particular model specification and provides a transformed ML model that is therefore compatible with the particular model specification (304). In an example, transforming the ML model may include mapping ML operations (e.g., corresponding to operations performed by nodes of a graph representing the ML model) in the ML model to match corresponding operations that may be defined by the model specification. After being in this compatible format, the IDE 200 can further process the transformed ML model and provide additional functionality as described above in FIG. 1.

The specification converter 220 tags the transformed ML model to indicate that the ML model has been transformed into the particular model specification (306). For example, tagging includes assigning an identifier to the transformed ML model so that the IDE 200 can reference the transformed ML model.

The OOP code generator 240 generates a code interface and code for the transformed ML model (308). The code interface includes code statements in the object oriented programming language in which the code statements correspond to an object representing the transformed ML model. The generated code may also correspond to the object. For example, the object may include code for one or more functions for performing operations of the transformed ML model in which each function may include input data types that map to data and/or data types that are utilized by the transformed ML model. The object, the code and the code interface corresponding to the transformed model may be presented in the user interface 280 of the IDE 200 (e.g., in the code listing 282 and/or the project navigator 284).

In one or more implementations, the OOP code generator 240 performs operations to generate code for the transformed ML model. For example, the OOP code generator 240 determines input data format used by an existing ML model (e.g., 3-D matrix with floating point values that are encoded serially in memory), and determines a target data format for transformed model (e.g., NSArrays, Swift array of arrays, or a new custom N-dimensional matrix). The OOP code generator 240 determines hardware/processing requirement for the existing ML model (e.g., does the existing model run on the GPU, the CPU, or via the cloud) and generates code to run on GPU, CPU, and/or cloud, etc. Further, the OOP code generator 240 takes machine learning primitives (e.g., entities, properties, matrices, and matrices processing steps) that are in the ML model and generates data objects compliant with the particular specification. Additionally, the OOP code generator 240 maps a function call to input data types (e.g., input vector, matrix, or whatever is required for the ML model). The OOP code generator 240 generates a function in the object oriented programming language.

A function corresponding to predicting the price of a home may be generated for the ML model A software developer can edit the generated code from the OOP code generator 240. For example, the software developer can review a function that is generated and determine whether additional edits are needed. Depending on a current project that is worked on in the IDE 200, the software developer may decide that additional code, written in a given OOP programming language (e.g., Objective C, Swift, etc.) of the current project, is required to meet one of the objectives of the current project. For example, the current project may correspond to predicting a price of a residential home for a particular geographic region by utilizing a given ML model. A function corresponding to predicting the price of a home for the ML model may be generated in which the software developer decides a modification and/or additional code is needed (e.g., an adjustment to the price calculation, the usage of additional data not provided by the ML model, etc.). The software developer may then leverage the functionality of the IDE 200 by editing this function and/or creating new code that calls the function, while advantageously gaining the benefit of real-time syntax checking while typing, auto-completion, detection of name or type errors in parameter lists, etc.

After the code for the ML model is generated and/or code modified or added by the software developer, the OOP language compiler 260 compiles the generated code and/or including any code modifications or additions provided by the software developer corresponding to the transformed machine learning model (310). Compiling the transformed machine learning model includes generating object code for the object oriented programming language. The OOP language compiler 260 also compiles the code interface to the transformed ML model (e.g., to enforce certain properties on the object representing the ML model). Respective object code may be generated from compiling the generated code and code interface. Further, any code modifications or additions provided by the software developer (e.g., code that calls on the generated function) is compiled to generate respective object code.

In an example, the linker/packager 270 combines all the object code corresponding to the ML model and/or code modified or added by the software developer, and transforms the object code into executable machine code (for a target computing device). The executable machine code may be in the form of a software package that can be deployed to the target computing device for being executed in a runtime environment of the target computing device. In an example, the linker/packager 270 can send a package including the compiled code to a runtime environment of a target device (312). Another example of deploying the compiled ML model for execution on a target device is discussed in FIG. 5.

Figure 4:
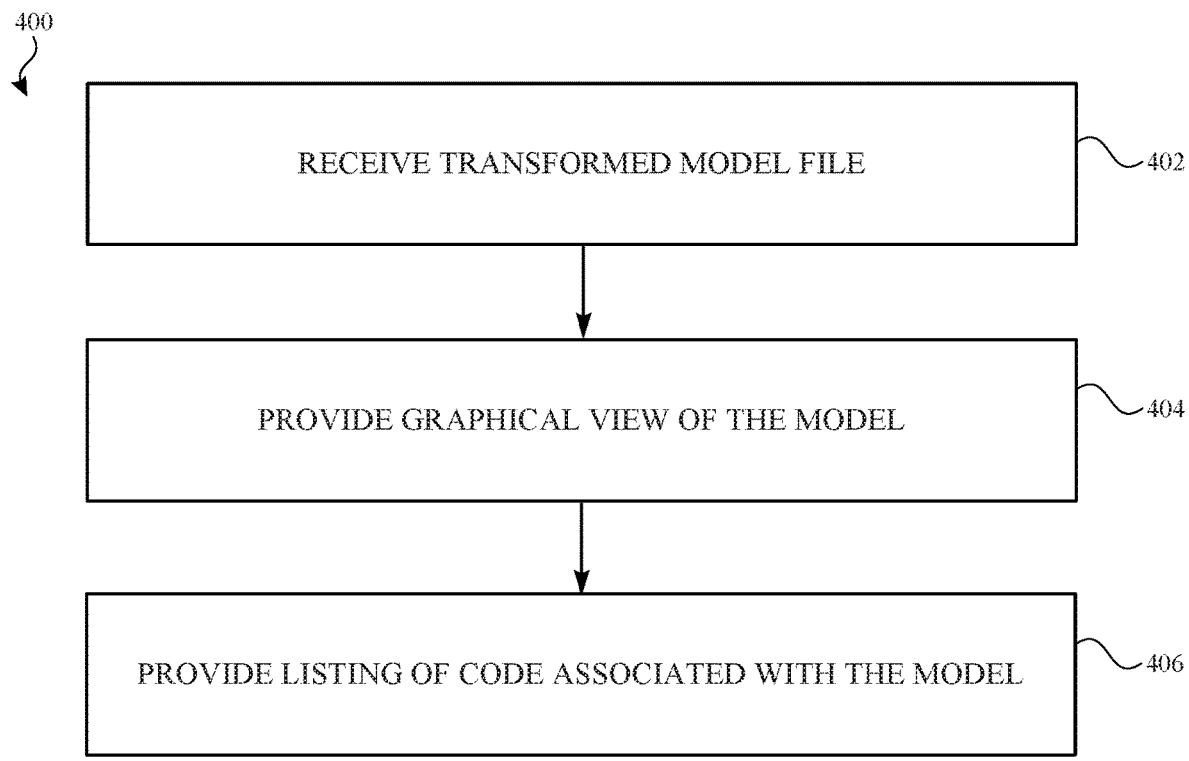
FIG. 4 illustrates a flow diagram of an example process for providing a transformed ML model for viewing in a software development environment in accordance with one or more implementations.

FIG. 4 illustrates a flow diagram of an example process 400 for providing a transformed ML model for viewing in a software development environment (e.g., the IDE 200) in accordance with one or more implementations. For explanatory purposes, the process 400 is primarily described herein with reference to components of the IDE 200 of FIG. 2, which may be executed by one or more processors of the electronic device 110 of FIG. 1. However, the process 400 is not limited to the electronic device 110 and/or the IDE 200, and one or more blocks (or operations) of the process 400 may be performed by one or more other components of other suitable devices and/or software development environments. Further for explanatory purposes, the blocks of the process 400 are described herein as occurring in serial, or linearly. However, multiple blocks of the process 400 may occur in parallel. In addition, the blocks of the process 400 need not be performed in the order shown and/or one or more blocks of the process 400 need not be performed and/or can be replaced by other operations.

The IDE 200 receives a transformed model file (402). In an example, the transformed model file is received in the IDE 200 after a user drags the file and drops the file into the user interface 280 of the IDE 200. The transformed model file may be provided, as described above, by reference to the operations described to FIG. 3, and is presumed herein to be compliant with a particular model specification supported by the IDE 200. In an example, the transformed model file may include a tag (e.g., an identifier) that indicates that the model file corresponds to the particular model specification. The IDE 200, in response to the dragged file, may create a new project corresponding to the transformed model file, or if a current project was already open, add the transformed model file to that current project.

As mentioned before, a software developer can view and/or edit the code corresponding to the transformed model file. For example, the software developer can review a function that is associated with the transformed model file and determine whether additional edits are needed. More specifically, the software developer may decide that additional code, written in a given OOP programming language (e.g., Objective C, Swift, etc.) of the current project, is required to meet one of the objectives of the current project. For example, the current project may correspond to predicting prices of residential homes for a particular geographic region by utilizing a given ML model. A function corresponding to predicting the price of a home may generated in which the software developer decides a modification and/or additional code is needed (e.g., an adjustment to the price calculation, the usage of additional data not provided by the ML model, etc.). The software developer may then leverage the functionality of the IDE 200 by editing this function and/or creating new code that calls the function, while advantageously gaining the benefit of real-time syntax checking while typing, auto-completion, detection of name or type errors in parameter lists, etc.

The IDE 200 provides a graphical view of the transformed model file (404). For example, the user interface 280 displays the model as an object (e.g., corresponding to an object oriented programming language) in the IDE 200, and the IDE 200 can provide information regarding properties of the object and/or access the data in the database 258 associated with preprocessing components of the IDE 200 (e.g., indexer 256, code completion component 254, and/or automated code documentation component 252). In another example, the project navigator 284 of the user interface 280 provides a hierarchical view of the object with different properties and/or provides a list of associated files (e.g., supporting files from a software library) or other related files/assets (e.g., images, videos, text, etc.). The user can therefore view and interact with the object in the project navigator 284 and utilize the functionality provided by the IDE 200 (e.g., to review and/or edit code corresponding to the transformed model file). Further, the user can add additional files and/or assets to the current project.

The IDE 200 provides listing of code associated with the transformed model file (406). For example, the user interface 280 provides the listing of code in the code listing 282 of the IDE 200. In this manner, the user can view and/or edit the code associated with the transformed model file and advantageously access the functionality provided by the IDE 200 such as type checking, detecting coding mistakes, debugging code, code completion, syntax highlighting, and providing other context-sensitive information with the code in the code listing 282.

In one or more implementations, the IDE 200 can deploy a compiled ML model to one or different target devices for execution. The compiled ML model may be included with a software package that is able to be deployed and executed on a given target computing device. When working on a project in the IDE 200, one or more target devices may be selected for compiling and/or deploying on the target platforms. The IDE 200 can generate different variants, which may be optimized for the particular hardware and/or software capabilities of a given platform, of the transformed ML model for deployment to such target devices. In an example, the IDE 200 can send the compiled ML model to the server 120, which can then, in turn, provide the compiled model to a target device.

Figure 5:
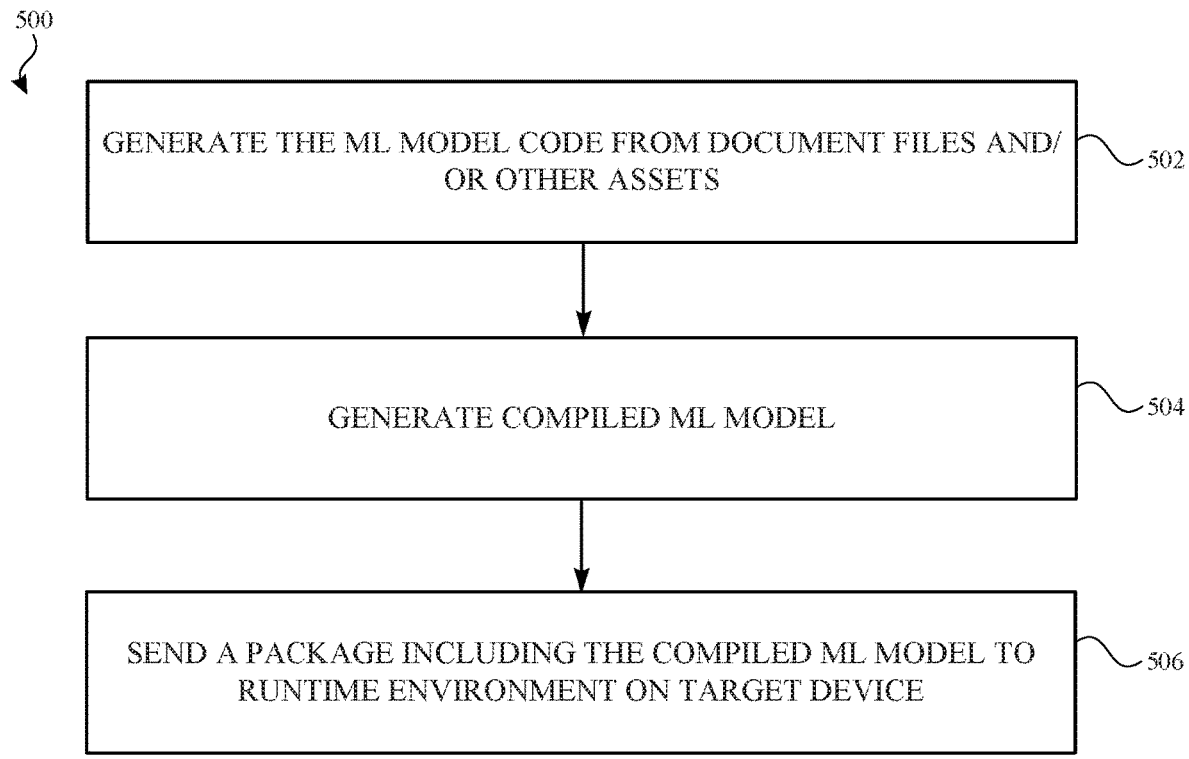
FIG. 5 illustrates an example process for sending a compiled ML model to a runtime environment of a target device in accordance with one or more implementations.

FIG. 5 illustrates an example process 500 for sending a compiled ML model to a runtime environment of a target device (e.g., the electronic device 115 in FIG. 1) in accordance with one or more implementations. For explanatory purposes, the process 500 is primarily described herein with reference to components of the IDE 200 of FIG. 2, which may be executed by the electronic device 110 of FIG. 1. However, the process 500 is not limited to the electronic device 110 and/or the IDE 200, and one or more blocks (or operations) of the process 500 may be performed by one or more other components of other suitable devices and/or software development environments. Further for explanatory purposes, the blocks of the process 500 are described herein as occurring in serial, or linearly. However, multiple blocks of the process 500 may occur in parallel. In addition, the blocks of the process 500 need not be performed in the order shown and/or one or more blocks of the process 500 need not be performed and/or can be replaced by other operations.

The OOP code generator 240 generates the ML model code from ML document files and/or other assets (502). In an example, building the ML model code may be performed as described by reference to FIG. 3 above. In this example, generating the ML model utilizes an implementation file (e.g., the .m file) or source code (e.g., Swift or Objective C source code) and/or data and/or other code corresponding to the ML model.

A software developer can view and/or edit the source code corresponding to the ML model. For example, the software developer can review a function that is associated with the ML model and determine whether additional edits are needed. More specifically, the software developer may decide that additional code, written in a given OOP programming language (e.g., Objective C, Swift, etc.) of the current project, is required to meet one of the objectives of the current project. For example, the current project may correspond to predicting prices of residential homes for a particular geographic region by utilizing a given ML model. A function corresponding to predicting the price of a home may generated in which the software developer decides a modification and/or additional code is needed (e.g., an adjustment to the price calculation, the usage of additional data not provided by the ML model, etc.). The software developer may then leverage the functionality of the IDE 200 by editing this function and/or creating new code that calls the function, while advantageously gaining the benefit of real-time syntax checking while typing, auto-completion, detection of name or type errors in parameter lists, etc.

The OOP language compiler 260 generates compiled ML model code from the ML model code (504) and/or any additional code provided by the software developer (e.g., to call a function corresponding to an operation provided by the ML model). In an example, the OOP language compiler 260 provides compiled object code (e.g., .o file) and/or a binary file (e.g., executable machine code).

The linker/packager 270 sends a package including the compiled ML model and/or any additional code provided by the software developer to a runtime environment on a target device (or user's desktop) for execution (506). In an example, different variants may be sent corresponding to respective target device (e.g., smartphone, wearable device, streaming media device, etc.). In another example, the linker/packager 270 can send the compiled ML model into an archive or package, which is then sent into cloud (e.g., application store or application server, cloud computing service, etc.) for deployment and/or execution. The ML model may include information regarding a type of device that the model will be built for (e.g., the target runtime environment). In another example, a target device may be selected by the user in the IDE 200 so that the OOP language compiler 260 and/or the linker/packager 270 can further optimize the compiled ML model. For example, the OOP language compiler 260 can optimize compilation of the code to use a GPU of a target device when such a GPU is present on the target device. In another example, the OOP language compiler 260 can optimize compilation for execution on a cloud computing service, which may provide a service for deploying and executing the compiled code utilizing a server (e.g., the server 120) provided in the network (e.g., the network 106).

Figure 6:
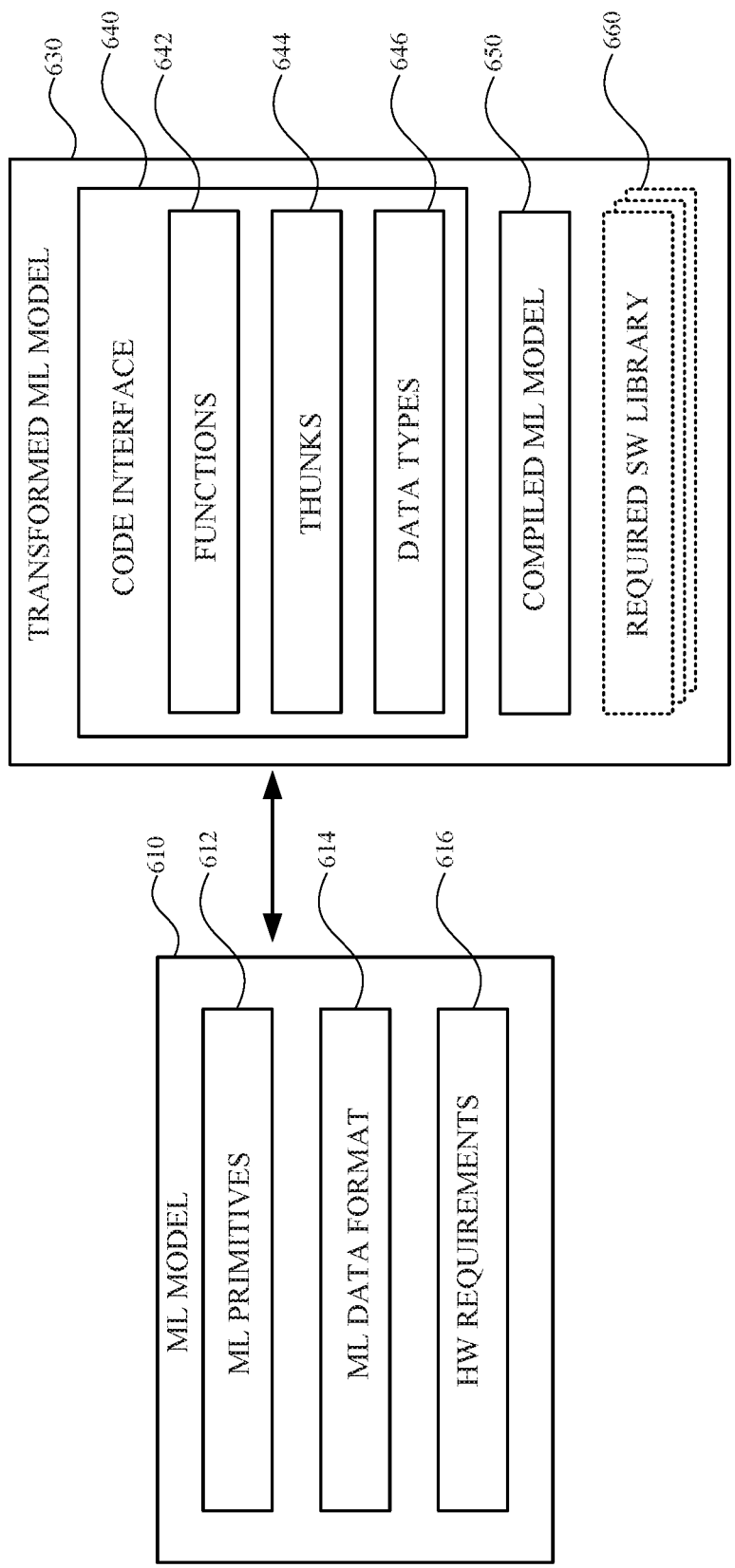
FIG. 6 illustrates an example structure of data for an existing ML model and a transformed ML model in accordance with one or more implementations.

FIG. 6 illustrates an example structure of data for an existing ML model 610 and a transformed ML model 630 in accordance with one or more implementations. Not all of the depicted components may be used in all implementations, however, and one or more implementations may include additional or different components than those shown in the figure. Variations in the arrangement and type of the components may be made without departing from the spirit or scope of the claims as set forth herein. Additional components, different components, or fewer components may be provided.

As mentioned above in FIGS. 1-4, an existing ML model may be transformed into a transformed model that conforms to a particular model specification. As illustrated, the ML model 610 represents an existing model in a different format from the particular model specification. The ML model 610 includes ML primitives 612, ML data format 614 of ML data (e.g., ML datasets for purposes such as training, validation, testing, etc.), and a set of hardware and/or processing requirements 616. The ML primitives 612 may include primitives such as entities, properties, matrices, and matrices processing steps that are utilized by the ML model 610. The ML data format 614 may indicate that the ML data is in a format that is encoded serially in memory, or some other data format, etc. The set of set of hardware and/or processing requirements 616 may include information indicating that the ML model 610 requires the use of a GPU and/or CPU and/or a cloud computing service for particular operations.

The transformed ML model 630 includes a code interface 640. The code interface 640 includes functions 642, thunks 644, and data types 646. The functions 642 may include information that maps a function call to input data types (e.g., input vector, matrix, or whatever is required for the ML model 610). The data types 646 (e.g., NSArrays, array of arrays such as Swift array of arrays, or a new custom N-dimensional matrix) may correspond to the ML data format 614 and enables the transformed ML model 630 to access ML data in the ML data format 614. To facilitate the access of such ML data, the thunks 644 provide subroutines for the functions 642 that are utilized. The transformed ML model 630 further includes compiled ML model code 650, which may be in object code format corresponding to a target device. Optionally, the transformed ML model 630 includes one or more required software libraries 660 depending on the set of hardware and/or processing requirements 616 (e.g., GPU processing, cloud computing, etc.) of the ML model 610.

Programming languages can require advanced editing and compiling software (e.g., the IDE 200) in order to edit, debug and compile source code. In some software development environments, a user (e.g., a software developer) can perform several manual steps before viewing the output of new code when executed. For example, in a typical development lifecycle, source code must be separately edited, compiled, and run (e.g., executed) before viewing the output of a given program. Newly created (or newly edited) code therefore is, in most instances, manually compiled and run before the output can be reviewed. Even for small amounts of source code, this development lifecycle can end up being time-consuming and wearisome, especially in instances in which educating users (e.g., students) about coding principle and concepts is the main goal.

In learning how to code, a user will write code, compile the code, and execute the code on a given electronic device (e.g., a desktop computer or laptop, etc.) to see if the expected results are provided. If the results are unexpected, the user will debug or edit the code, compile the code, and execute the compiled code on the electronic device again. Such a learning process can be discouraging to users, such as students, because of the amount of time between coding, compiling, executing the code, and then viewing the output of the results. Many users would likely prefer to see the results in near real-time in a more interactive learning environment.

Thus, a software development environment may be provided where source code is received from a software developer (e.g., a user), and in which real-time visualizations and displays of outputs for particular variables and results of code execution, without requiring a full compilation of the code, are concurrently shown to the user as each line of code is interpreted (e.g., using an interpreter) by the software development environment. In an example, outputs of the code execution can be automatically displayed to the user, for example, in an output window provided in conjunction with an editor interface, or in another window in which real-time animated variable outputs can be viewed.

With the recent popularity of machine learning and artificial intelligence, users are becoming increasingly interested in these areas. The learning curve, however, can be very steep for users to learn about machine learning models and related machine learning coding techniques. Even in the aforementioned software development environment where real-time visualizations and concurrent outputs of the code are provided, there may a lack of support for a user, such as a student and/or software developer, to easily include machine learning models and/or any related machine learning code.

In one or more implementations of the subject technology, a user can provide code for an existing machine learning model in an integrated development environment (IDE) that utilizes an interpreter for interpreting each line of code. For a given set of code in the IDE that utilizes an interpreter, existing machine learning (ML) code may be detected (e.g., by parsing lines of code) and converted into a second type of source code (e.g., Swift code) for interpreting within the IDE. As referred to herein, an interpreter directly executes code written in a given programming language (e.g., Swift), without previously compiling the code into machine language instructions that are executable by a given electronic device. The IDE 200 in FIG. 2 can include an additional interpreter component in this regard which can execute code written in an object oriented programming language without compiling the code ahead of time, or execute code when edits are made to the code in the code listing provided in an editor, and then display the output of the results of the executed code inline with the code, or in another window or interface provided in the user interface 280.

Figure 7:
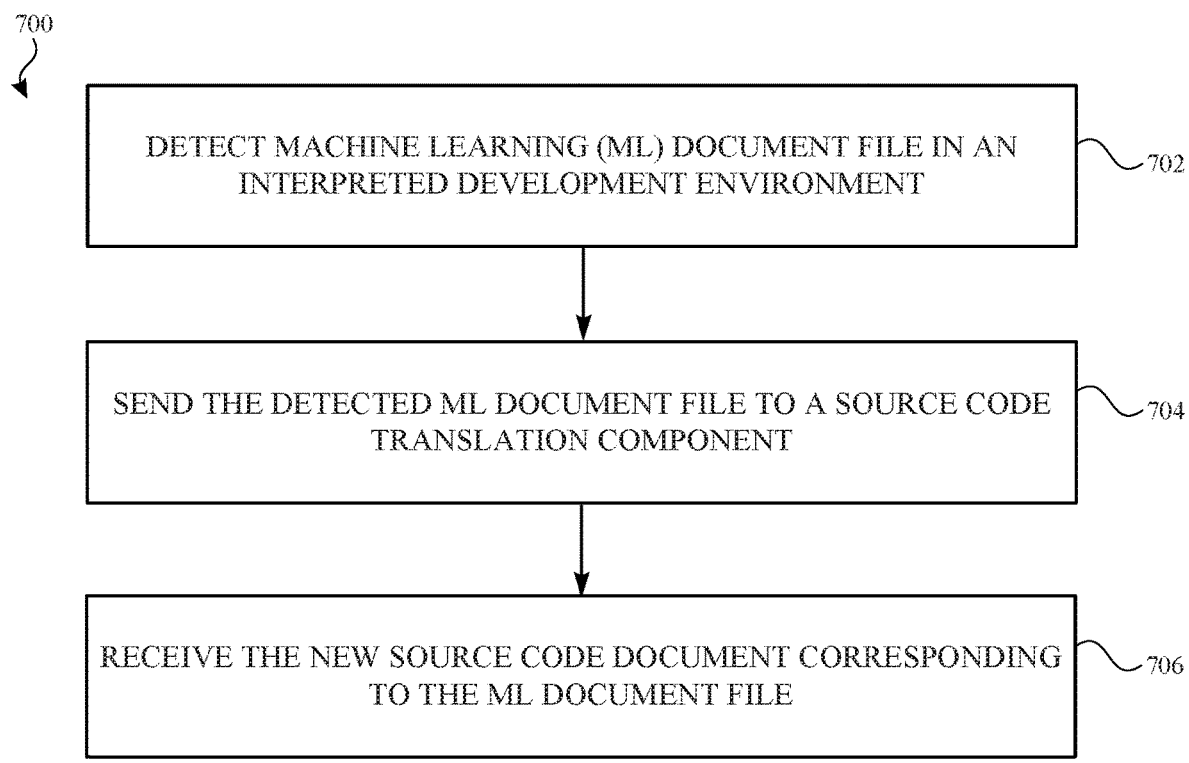
FIG. 7 illustrates an example process for detecting, converting, and associating source code corresponding to a machine language model to source code that is supported by an interpreted development environment in accordance with one or more implementations.

FIG. 7 illustrates an example process 700 for detecting, converting, and associating source code corresponding to a machine language model to source code that is supported by an interpreted development environment that includes an interpreter component in accordance with one or more implementations. For explanatory purposes, the process 700 is primarily described herein with reference to components of the interpreted development environment 290 of FIG. 2, which may be executed by the electronic device 110 of FIG. 1. However, the process 700 is not limited to the electronic device 110 and/or the interpreted development environment 290, and one or more blocks (or operations) of the process 700 may be performed by one or more other components of other suitable devices and/or software development environments. Further for explanatory purposes, the blocks of the process 700 are described herein as occurring in serial, or linearly. However, multiple blocks of the process 700 may occur in parallel. In addition, the blocks of the process 700 need not be performed in the order shown and/or one or more blocks of the process 700 need not be performed and/or can be replaced by other operations.

The interpreted development environment 290 detects machine learning (ML) source code (702). In an example, the interpreted development environment 290 utilizes the interpreter 295 to interpret code. The interpreter 295 can translate one statement (or line of code) at a time into an intermediate format, without generating any object code (usually produced by a compiler), which is generally more memory efficient but slower than running code in compiled form.

A ML model (or ML related data) may be detected after an ML document file is received (e.g., through a drag and drop operation) into a code listing 282 shown in an editor provided by the user interface 280. Further, the ML document file may have a specific file extension that is recognized by the interpreted development environment 290. The ML document file may include code, supported by a ML specific software library (e.g., TensorFlow, etc.), that is written in a particular programming language that is not supported by the interpreted development environment 290.

In one example, the ML document file may be received as code input (e.g., when a user types into an editor interface) by the interpreted development environment 290. In another example, ML document file can also be received via a microphone or audio input, and/or may be loaded from one or more pre-existing ML document files. A ML document file can be received by the interpreted development environment 290 through another input type, such as a computer mouse, electronic pencil/stylus, or touch input that is used to copy (or cut) and paste lines of source code into the editor interface. Such a ML document file may be provided for display in the code listing 282 of the editor provided by the user interface 280 of the interpreted development environment 290.

In response to detecting the ML document file, the interpreted development environment 290 sends the detected ML document file to a source code translation component to generate a new source code document in a programming language (e.g., Swift or another object oriented programming language) specific to the interpreted development environment 290 (704). In an implementation involving the Swift programming language, the new source code document includes Swift code that would make calls to a machine learning API, in which the API call would execute the ML code by referencing the original ML document file (e.g., the ML document file that was received by the interpreted development environment 290 described above).

The interpreted development environment 290 receives, from the source code translation component, the new source code document corresponding to the ML document file (706). The new source code document includes code in the programming language (e.g., Swift code) supported by the interpreted development environment 290. In an implementation, the new source code document is stored in particular folder (or any other location) with other source code documents (e.g., in the storage 210). Further, in an implementation, the new source code document is considered a "hidden" file in the existing project (e.g., the user is not able to view or edit the new source code document by using the project navigator 284).

When the interpreter 295 interprets a line of code corresponding to the ML document file (which the interpreted development environment 290 cannot execute) in the code listing 282 shown in the editor of the interpreted development environment 290, the interpreter 295 executes the code (e.g., Swift code) included in the new source code document via the reference. An example process of interpreting code in the IDE is described in FIG. 8 below.

Figure 8:
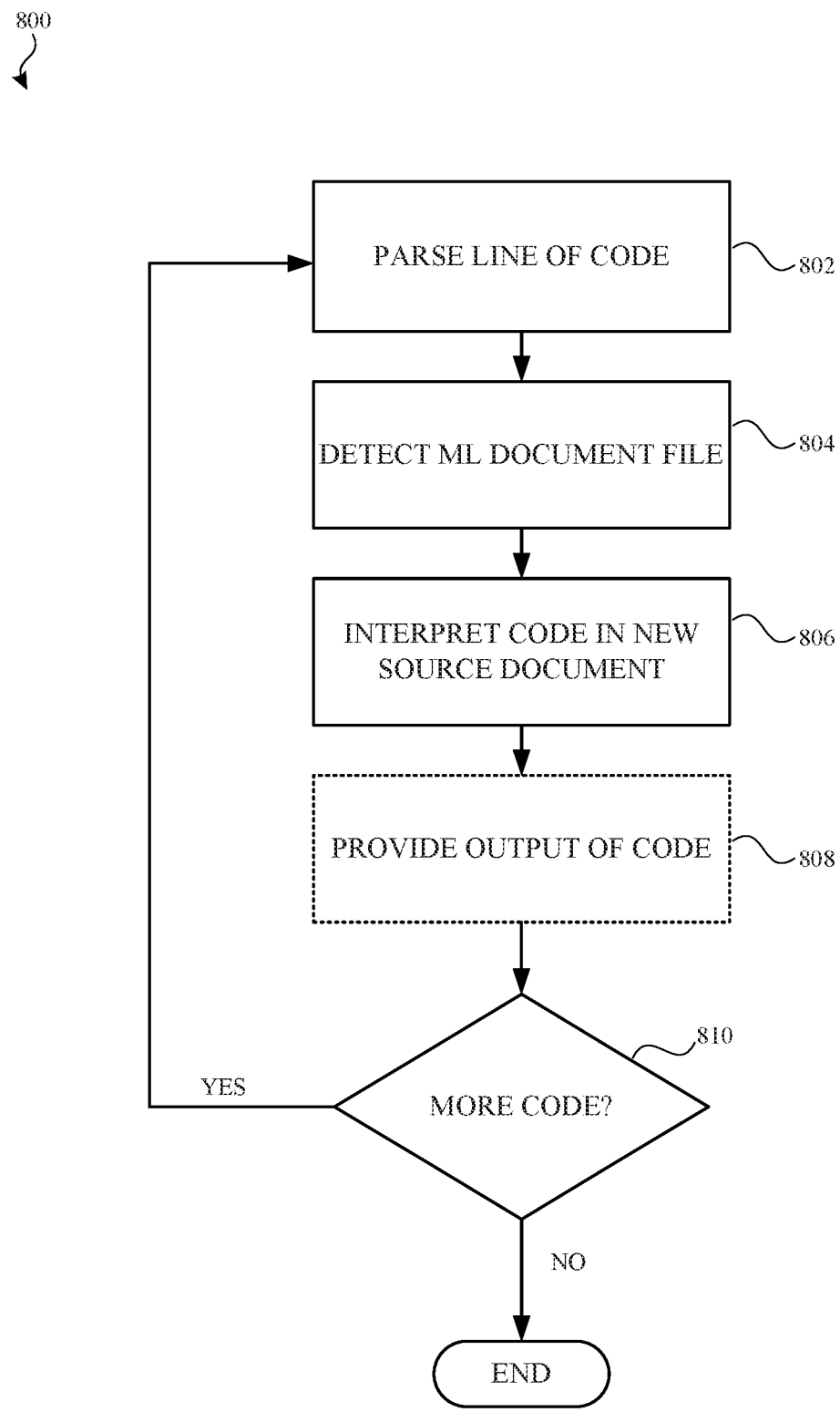
FIG. 8 illustrates an example process for interpreting a ML document file, corresponding to a machine language model, in an interpreted development environment in accordance with one or more implementations.

FIG. 8 illustrates an example process 800 for interpreting a ML document file, corresponding to a machine language model, in an interpreted development environment in accordance with one or more implementations. For explanatory purposes, the process 800 is primarily described herein with reference to components of the interpreted development environment 290 of FIG. 2, which may be executed by the electronic device 110 of FIG. 1. However, the process 800 is not limited to the electronic device 110 and/or the interpreted development environment 290, and one or more blocks (or operations) of the process 800 may be performed by one or more other components of other suitable devices and/or software development environments. Further for explanatory purposes, the blocks of the process 800 are described herein as occurring in serial, or linearly. However, multiple blocks of the process 800 may occur in parallel. In addition, the blocks of the process 800 need not be performed in the order shown and/or one or more blocks of the process 800 need not be performed and/or can be replaced by other operations.

In one or more implementations, when a ML model (e.g., a ML document file) is loaded as part of a project in the interpreted development environment 290, the ML model is evaluated and transformed into code, compiled, and made available for immediate evaluation by the interpreted code or other compiled code in the interpreted development environment 290.

Additionally ML model is processed to extract the weights and other values which are useful at runtime and loaded as part of the execution of the compiled code corresponding to the generated code generated from the ML model and then used during model execution.

After the ML document file in a project of the interpreted development environment 290 is converted to a supported programming language in the interpreted development environment 290 as described by reference to FIG. 7, the interpreter 295 (provided by the interpreted development environment 290) parses the lines of code corresponding to the ML document file in the current project (e.g., in a code listing 282 of the current project).

The interpreter 295 parses a line of code in a project of the interpreted development environment 290 (802). The interpreter 295 detects that the parsed line of code corresponds a ML document file (e.g., now in Swift code form in a new source document as described in FIG. 7 above) in the project (804). The line of ML code in the current project references code in a corresponding new source document, which includes the converted code (e.g., in Swift programming language) that can be directly executed by the interpreter 295.

In another example, a given line of code may be entered in by the user, which is then parsed by the interpreter 295 and immediately evaluated by the interpreter 295.

The interpreter 295 interprets the code in the new source document (806), which directly executes the code without having to compile the code ahead of time (or generate object code). In an example involving Swift code, the Swift code in the new source document can make calls to a given machine learning API to execute the ML code.

An output of the interpreted (e.g., executed) code may be provided (808). The output may be displayed inline in the project (e.g., in the code listing 282 of the project) and/or in a separate display window. An example graphical user interface for showing the output of interpreted ML code is described below in FIG. 9.

If more code is in the code listing of the current project (810), another line of code is parsed (802) and the following operations described before are performed. Otherwise if there are no other lines of code (810), the process 800 may end.

Figure 9:
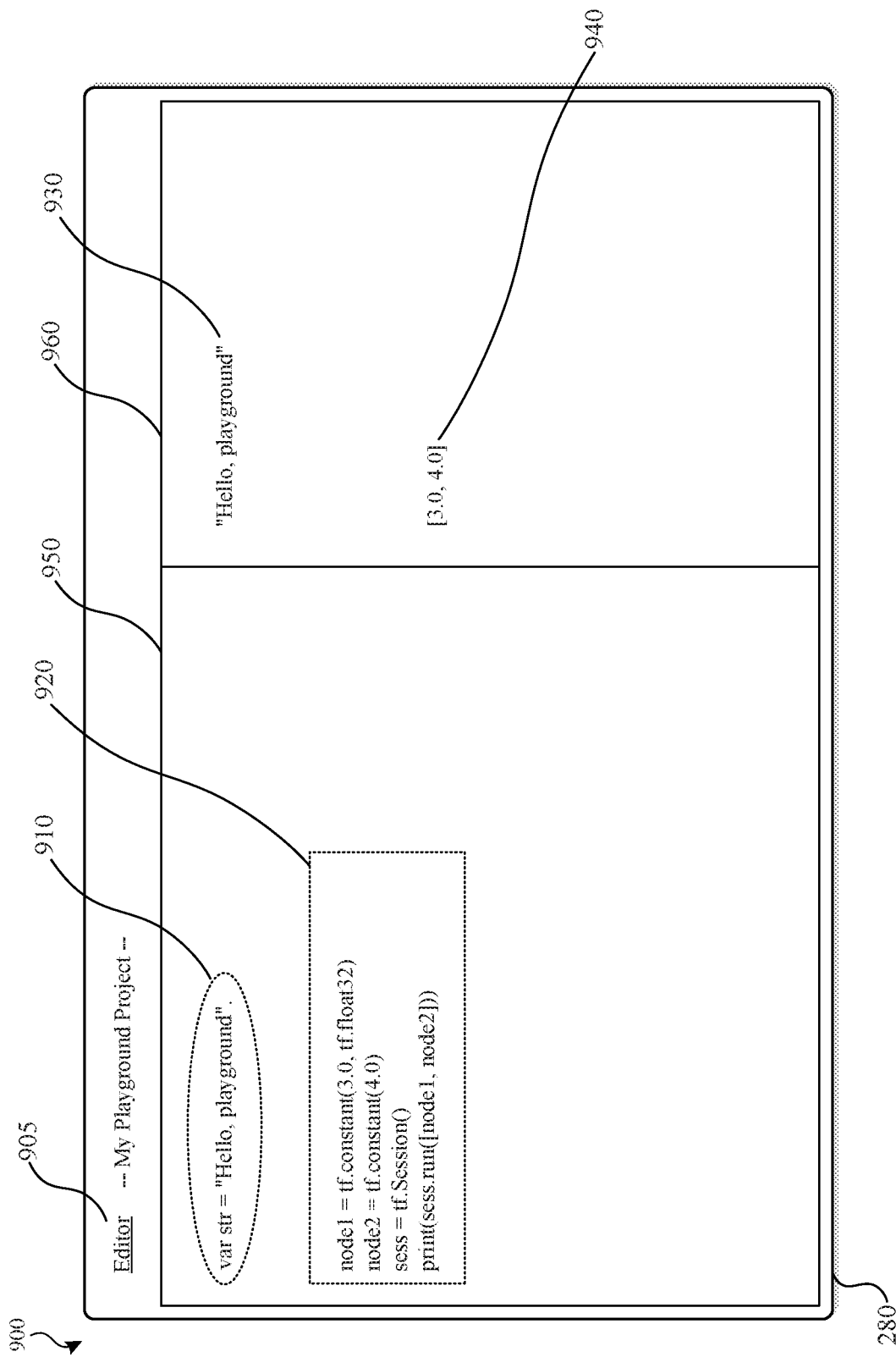
FIG. 9 illustrates an example graphical user interface for interpreting a ML document file in an interpreted development environment in accordance with one or more implementations.

FIG. 9 illustrates an example graphical user interface (GUI) 900 for interpreting a ML document file in an interpreted development environment in accordance with one or more implementations. FIG. 9 is discussed by reference to the user interface 280 of the IDE 200 in FIG. 2.

As illustrated, the user interface 280 includes an editor interface 905 providing a display of a current project. The editor interface includes an editor window 950 with a code listing that includes a first set of code 910 in a first programming language (e.g., Swift code) and a second set of code 920 corresponding to a machine learning (ML) document file in a particular ML data format (e.g., TensorFlow code that may be stored on storage 210 in FIG. 2). As discussed above, the second set of code 920 has been converted to be compatible with the IDE 200 by generating a new source code document as described in FIG. 7. More specifically, the second set of code 920 corresponds to code in the new source document that is written in a programming language that is supported by the IDE 200 (e.g., Swift code in an example).

An interpreter 295 provided by the IDE 200 can parse each line of code in the editor window 950 and provide an output of the results, if any. By way of example, the interpreter 295 first parses a line of code from the first set of code 910 corresponding to the code statement var str="Hello, playground". The interpreter 295 executes this line of code, without compiling, and provides a first output 930 in an output window 960. In this example the first output 930 indicates the value (e.g., "Hello, playground") of the string value assigned to the variable str. Although the output of the interpreted line of code is shown in the output window 960, in another example, the output can be displayed inline with the code listing shown in the editor interface 905 (e.g., below the first set of code 910 in an example).

The interpreter 295 can then parse a line of code from the second set of code 920. In this example, there is no output for this parsed line of code for node1=tf.constant(3.0, tf.float32). Similarly, the interpreter 295 can parse a second and third line of code from the second set of code 920, and execute these lines of code, one by one, which do not produce any output to be shown in the output window 960. The interpreter 295 then parses a last line of code, corresponding to print(sess.run([node1, node2])), from the second set of code 920, and executes the parsed line of code. The output from the executed last line of code from the second set of code 920 is then provided in the output window 960. In this example, the output 940 of the ML document file indicates the values [3.0, 4.0] of node1 and node2, respectively.

In parsing the lines of code from the second set of code 920, the interpreter 295 can detect that each line of code corresponds to a ML document file which is not supported by the IDE 200. In order to execute the line of code corresponding to unsupported ML code, the interpreter 295 references code in a corresponding new source document, which includes the converted code (e.g., in Swift programming language) that can be directly executed by the interpreter 295. Any output from the executed code can then be provided in the output window 960 as discussed above.

Figure 10:
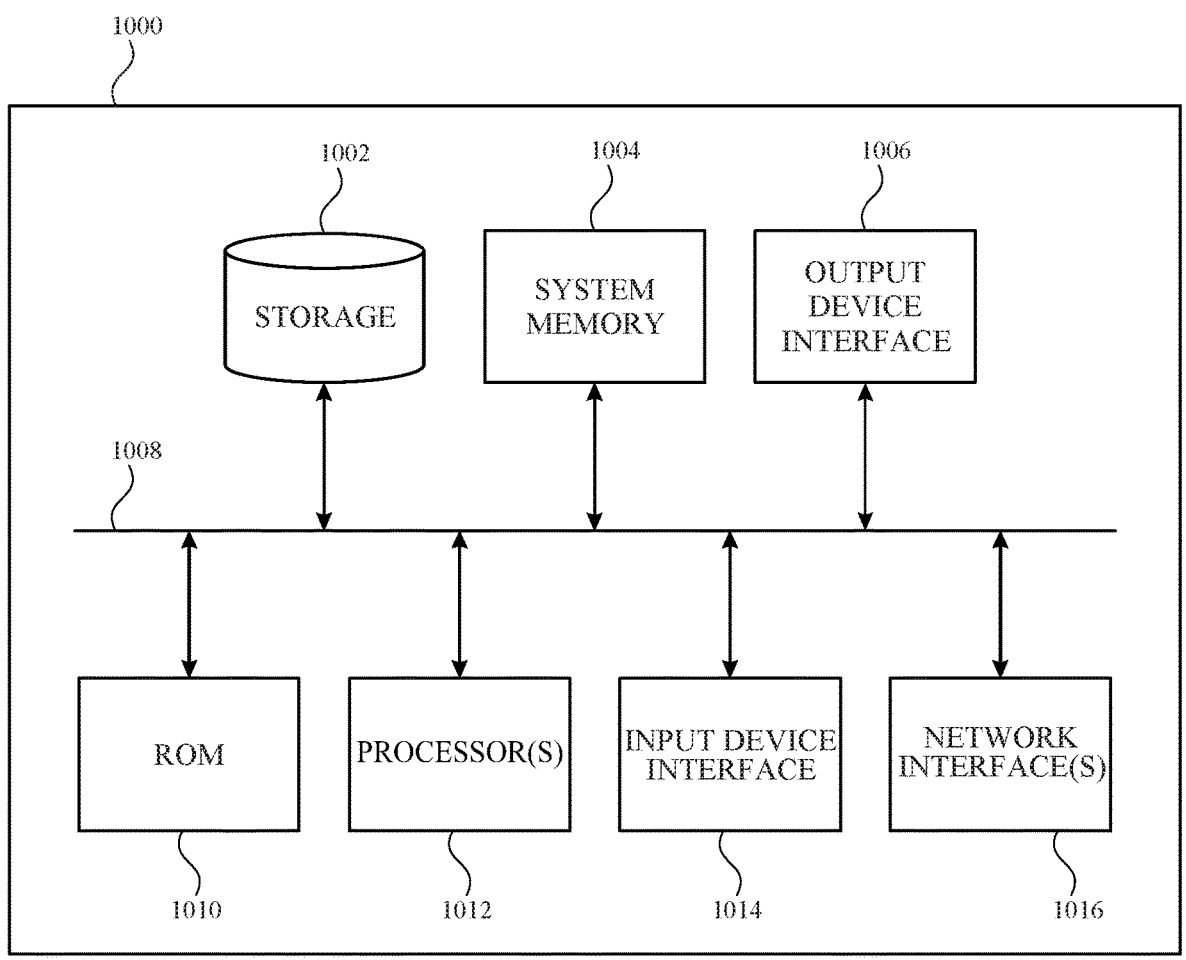
FIG. 10 illustrates an electronic system with which one or more implementations of the subject technology may be implemented.

FIG. 10 illustrates an electronic system 1000 with which one or more implementations of the subject technology may be implemented. The electronic system 1000 can be, and/or can be a part of, the electronic device 110, and/or the server 120 shown in FIG. 1. The electronic system 1000 may include various types of computer readable media and interfaces for various other types of computer readable media. The electronic system 1000 includes a bus 1008, one or more processing unit(s) 1012, a system memory 1004 (and/or buffer), a ROM 1010, a permanent storage device 1002, an input device interface 1014, an output device interface 1006, and one or more network interfaces 1016, or subsets and variations thereof.

The bus 1008 collectively represents all system, peripheral, and chipset buses that communicatively connect the numerous internal devices of the electronic system 1000. In one or more implementations, the bus 1008 communicatively connects the one or more processing unit(s) 1012 with the ROM 1010, the system memory 1004, and the permanent storage device 1002. From these various memory units, the one or more processing unit(s) 1012 retrieves instructions to execute and data to process in order to execute the processes of the subject disclosure. The one or more processing unit(s) 1012 can be a single processor or a multi-core processor in different implementations.

The ROM 1010 stores static data and instructions that are needed by the one or more processing unit(s) 1012 and other modules of the electronic system 1000. The permanent storage device 1002, on the other hand, may be a read-and-write memory device. The permanent storage device 1002 may be a non-volatile memory unit that stores instructions and data even when the electronic system 1000 is off. In one or more implementations, a mass-storage device (such as a magnetic or optical disk and its corresponding disk drive) may be used as the permanent storage device 1002.

In one or more implementations, a removable storage device (such as a floppy disk, flash drive, and its corresponding disk drive) may be used as the permanent storage device 1002. Like the permanent storage device 1002, the system memory 1004 may be a read-and-write memory device. However, unlike the permanent storage device 1002, the system memory 1004 may be a volatile read-and-write memory, such as random access memory. The system memory 1004 may store any of the instructions and data that one or more processing unit(s) 1012 may need at runtime. In one or more implementations, the processes of the subject disclosure are stored in the system memory 1004, the permanent storage device 1002, and/or the ROM 1010. From these various memory units, the one or more processing unit(s) 1012 retrieves instructions to execute and data to process in order to execute the processes of one or more implementations.

The bus 1008 also connects to the input and output device interfaces 1014 and 1006. The input device interface 1014 enables a user to communicate information and select commands to the electronic system 1000. Input devices that may be used with the input device interface 1014 may include, for example, alphanumeric keyboards and pointing devices (also called "cursor control devices"). The output device interface 1006 may enable, for example, the display of images generated by electronic system 1000. Output devices that may be used with the output device interface 1006 may include, for example, printers and display devices, such as a liquid crystal display (LCD), a light emitting diode (LED) display, an organic light emitting diode (OLED) display, a flexible display, a flat panel display, a solid state display, a projector, or any other device for outputting information. One or more implementations may include devices that function as both input and output devices, such as a touchscreen. In these implementations, feedback provided to the user can be any form of sensory feedback, such as visual feedback, auditory feedback, or tactile feedback; and input from the user can be received in any form, including acoustic, speech, or tactile input.

Finally, as shown in FIG. 10, the bus 1008 also couples the electronic system 1000 to one or more networks and/or to one or more network nodes, such as the electronic device 110 and/or 115 shown in FIG. 1, through the one or more network interface(s) 1016. In this manner, the electronic system 1000 can be a part of a network of computers (such as a LAN, a wide area network ("WAN"), or an Intranet, or a network of networks, such as the Internet. Any or all components of the electronic system 1000 can be used in conjunction with the subject disclosure.

Implementations within the scope of the present disclosure can be partially or entirely realized using a tangible computer-readable storage medium (or multiple tangible computer-readable storage media of one or more types) encoding one or more instructions. The tangible computer-readable storage medium also can be non-transitory in nature.

The computer-readable storage medium can be any storage medium that can be read, written, or otherwise accessed by a general purpose or special purpose computing device, including any processing electronics and/or processing circuitry capable of executing instructions. For example, without limitation, the computer-readable medium can include any volatile semiconductor memory, such as RAM, DRAM, SRAM, T-RAM, Z-RAM, and TTRAM. The computer-readable medium also can include any non-volatile semiconductor memory, such as ROM, PROM, EPROM, EEPROM, NVRAM, flash, nvSRAM, FeRAM, FeTRAM, MRAM, PRAM, CBRAM, SONOS, RRAM, NRAM, racetrack memory, FJG, and Millipede memory.

Further, the computer-readable storage medium can include any non-semiconductor memory, such as optical disk storage, magnetic disk storage, magnetic tape, other magnetic storage devices, or any other medium capable of storing one or more instructions. In one or more implementations, the tangible computer-readable storage medium can be directly coupled to a computing device, while in other implementations, the tangible computer-readable storage medium can be indirectly coupled to a computing device, e.g., via one or more wired connections, one or more wireless connections, or any combination thereof.

Instructions can be directly executable or can be used to develop executable instructions. For example, instructions can be realized as executable or non-executable machine code or as instructions in a high-level language that can be compiled to produce executable or non-executable machine code. Further, instructions also can be realized as or can include data. Computer-executable instructions also can be organized in any format, including routines, subroutines, programs, data structures, objects, modules, applications, applets, functions, etc. As recognized by those of skill in the art, details including, but not limited to, the number, structure, sequence, and organization of instructions can vary significantly without varying the underlying logic, function, processing, and output.

While the above discussion primarily refers to microprocessor or multi-core processors that execute software, one or more implementations are performed by one or more integrated circuits, such as ASICs or FPGAs. In one or more implementations, such integrated circuits execute instructions that are stored on the circuit itself.

Those of skill in the art would appreciate that the various illustrative blocks, modules, elements, components, methods, and algorithms described herein may be implemented as electronic hardware, computer software, or combinations of both. To illustrate this interchangeability of hardware and software, various illustrative blocks, modules, elements, components, methods, and algorithms have been described above generally in terms of their functionality. Whether such functionality is implemented as hardware or software depends upon the particular application and design constraints imposed on the overall system. Skilled artisans may implement the described functionality in varying ways for each particular application. Various components and blocks may be arranged differently (e.g., arranged in a different order, or partitioned in a different way) all without departing from the scope of the subject technology.

It is understood that any specific order or hierarchy of blocks in the processes disclosed is an illustration of example approaches. Based upon design preferences, it is understood that the specific order or hierarchy of blocks in the processes may be rearranged, or that all illustrated blocks be performed. Any of the blocks may be performed simultaneously. In one or more implementations, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products.

As used in this specification and any claims of this application, the terms "base station", "receiver", "computer", "server", "processor", and "memory" all refer to electronic or other technological devices. These terms exclude people or groups of people. For the purposes of the specification, the terms "display" or "displaying" means displaying on an electronic device.

As used herein, the phrase "at least one of" preceding a series of items, with the term "and" or "or" to separate any of the items, modifies the list as a whole, rather than each member of the list (i.e., each item). The phrase "at least one of" does not require selection of at least one of each item listed; rather, the phrase allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C.

The predicate words "configured to", "operable to", and "programmed to" do not imply any particular tangible or intangible modification of a subject, but, rather, are intended to be used interchangeably. In one or more implementations, a processor configured to monitor and control an operation or a component may also mean the processor being programmed to monitor and control the operation or the processor being operable to monitor and control the operation. Likewise, a processor configured to execute code can be construed as a processor programmed to execute code or operable to execute code.

Phrases such as an aspect, the aspect, another aspect, some aspects, one or more aspects, an implementation, the implementation, another implementation, some implementations, one or more implementations, an embodiment, the embodiment, another embodiment, some implementations, one or more implementations, a configuration, the configuration, another configuration, some configurations, one or more configurations, the subject technology, the disclosure, the present disclosure, other variations thereof and alike are for convenience and do not imply that a disclosure relating to such phrase(s) is essential to the subject technology or that such disclosure applies to all configurations of the subject technology. A disclosure relating to such phrase(s) may apply to all configurations, or one or more configurations. A disclosure relating to such phrase(s) may provide one or more examples. A phrase such as an aspect or some aspects may refer to one or more aspects and vice versa, and this applies similarly to other foregoing phrases.

The word "exemplary" is used herein to mean "serving as an example, instance, or illustration". Any embodiment described herein as "exemplary" or as an "example" is not necessarily to be construed as preferred or advantageous over other implementations. Furthermore, to the extent that the term "include", "have", or the like is used in the description or the claims, such term is intended to be inclusive in a manner similar to the term "comprise" as "comprise" is interpreted when employed as a transitional word in a claim.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for".

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language claims, wherein reference to an element in the singular is not intended to mean "one and only one" unless specifically so stated, but rather "one or more". Unless specifically stated otherwise, the term "some" refers to one or more. Pronouns in the masculine (e.g., his) include the feminine and neuter gender (e.g., her and its) and vice versa.

Headings and subheadings, if any, are used for convenience only and do not limit the subject disclosure.

What is claimed is:

1. A system comprising;
a processor;
a memory device containing instructions, which when executed by the processor cause the processor to:
receive a line of code as user input to an integrated development environment (IDE), the line of code being in a chosen object-oriented programming language specific to the IDE;
responsive to receipt of the line of code, parse the line of code in the IDE, the IDE utilizing an interpreter for executing lines of code in a project, wherein the interpreter is configured to translate the lines of code one at a time into an intermediate format that differs from the chosen object-oriented programming language;
execute indirectly, using the interpreter, the parsed line of code, wherein the interpreter references a distinct preprocessed translated source code document generated by a source code translation component from a machine learning (ML) document written in a particular data format, the translated source code document including source code in the chosen object-oriented programming language specific to the IDE that is different from the intermediate format, the translated source code document being separate from the line of code, and the source code of the translated source code document being executable by the interpreter, wherein the translated source code document includes code that makes a call to an application programming interface (API), the call to the API executing the ML document; and
provide, by the interpreter, an output of the executed parsed line of code based on execution, by the interpreter, of the translated source code document.

2. The system of claim 1, wherein the interpreter executes the parsed line of code without compiling the parsed line of code.

3. The system of claim 1, wherein the output of the executed parsed line of code is provided inline with a listing of other lines of code in the IDE.

4. The system of claim 1, wherein the output of the executed parsed line of code is provided in a separate window in the IDE.

5. The system of claim 1, wherein the interpreter parses a second line of code in the project of the IDE, the second line of code being code that the interpreter is able to directly execute.

6. The system of claim 1, wherein the memory device contains further instructions, which when executed by the processor further causes the processor to:
detect a second ML document in the IDE, the second ML document being written in the particular data format;
in response to detecting the second ML document, send the detected second ML document to the source code translation component to generate a translated second source code document in the chosen object-oriented programming language specific to the IDE; and
receive the translated second source code document corresponding to the second ML document, from the source code translation component, in the chosen object-oriented programming language, wherein the translated second source code document is associated with the second ML document in the project of the IDE utilizing the interpreter, the second ML document referencing the translated second source code document.

7. The system of claim 1, wherein the memory device contains further instructions, which when executed by the processor further causes the processor to:
provide a graphical view of a code listing in an editor window of the IDE, the editor window including a set of code written in the chosen object-oriented programming language and a second set of code in the particular data format;
provide a first output of executing the set of code written in the chosen object-oriented programming language; and
provide a second output of executing the second set of code in the particular data format.

8. A method comprising:
parsing a line of code in a project of an integrated development environment (IDE), the IDE utilizing an interpreter for executing lines of code in the project and the line of code being in a chosen object-oriented programming language specific to the IDE, wherein the interpreter is configured to translate the lines of code one at a time into an intermediate format that differs from the chosen object-oriented programming language;
executing indirectly, using the interpreter, the parsed line of code, wherein the interpreter references a translated source code document generated by a source code translation component from a machine learning (ML) document written in a particular data format, the translated source code document including source code in the chosen object-oriented programming language specific to the IDE that is different from the intermediate format, the source code of the translated source code document executable by the interpreter, and the line of code in the project being separate from the translated source code document, wherein the translated source code document includes code that makes a call to an application programming interface (API), the call to the API executing the ML document; and
providing, by the interpreter, an output of the executed parsed line of code.

9. The method of claim 8, wherein the interpreter executes the parsed line of code without compiling the parsed line of code.

10. The method of claim 8, wherein the output of the executed parsed line of code is provided inline with a listing of other lines of code in the IDE.

11. The method of claim 8, wherein the output of the executed parsed line of code is provided in a separate window in the IDE.

12. The method of claim 8, wherein the interpreter parses a second line of code in the project of the IDE, the second line of code being code that the interpreter is able to directly execute.

13. The method of claim 8, further comprising:
detecting a second ML document in the IDE that utilizes the interpreter to interpret code, the second ML document being written in the particular data format;
in response to detecting the second ML document, sending the detected second ML document to the source code translation component to generate a translated second source code document in the chosen object-oriented programming language specific to the IDE; and
receiving the translated second source code document corresponding to the second ML document, from the source code translation component, in the chosen object-oriented programming language, wherein the translated second source code document is associated with the second ML document in the project of the IDE utilizing the interpreter, the second ML document referencing the translated second source code document.

14. The method of claim 8, further comprising:
providing a graphical view of a code listing in an editor window of the IDE, the editor window including a set of code written in the chosen object-oriented programming language and a second set of code in the particular data format;
providing a first output of executing the set of code written in the chosen object-oriented programming language; and
providing a second output of executing the second set of code in the particular data format.

15. A non-transitory computer-readable medium comprising instructions, which when executed by a computing device, cause the computing device to perform operations comprising:
parsing a line of code in a project of an integrated development environment (IDE), the IDE utilizing an interpreter for executing lines of code in the project, and the line of code being in an object-oriented programming language specific to the IDE, wherein the interpreter is configured to translate the lines of code one at a time into an intermediate format that differs from the chosen object-oriented programming language;
execute indirectly, using the interpreter, the parsed line of code, wherein the interpreter references a translated source code document generated by a source code translation component from a machine learning (ML) document written in a particular data format, the translated source code document including source code in the object-oriented programming language specific to the IDE that is different from the intermediate format, and the source code of the translated source code document executable by the interpreter, wherein the translated source code document includes code that makes a call to an application programming interface (API), the call to the API executing the ML document; and
providing, by the interpreter, an output of the executed parsed line of code.

16. The non-transitory computer-readable medium of claim 15, wherein the non-transitory computer-readable medium comprises further instructions, which when executed by the computing device, cause the computing device to perform further operations comprising:
detecting a second ML document in the IDE, the second ML document being written in the particular data format;
in response to detecting the second ML document, sending the detected second ML document to the source code translation component to generate a translated second source code document in the chosen object-oriented programming language specific to the IDE; and
receiving the translated second source code document corresponding to the second ML document, from the source code translation component, in the chosen object-oriented programming language, wherein the translated second source code document is associated with the second ML document in an IDE project utilizing the interpreter, the second ML document referencing the translated second source code document.

17. The non-transitory computer-readable medium of claim 15, wherein the interpreter executes the parsed line of code without compiling the parsed line of code.

18. The non-transitory computer-readable medium of claim 15, wherein the output of the executed parsed line of code is provided inline with a listing of other lines of code in the IDE.

19. The non-transitory computer-readable medium of claim 15, wherein the output of the executed parsed line of code is provided in a separate window in the IDE.

20. The non-transitory computer-readable medium of claim 15, wherein the interpreter parses a second line of code in the project of the IDE, the second line of code being code that the interpreter is able to directly execute.

* * * * *